United States Patent

[11] 3,539,197

[72] Inventor Jacques Remaud, Billancourt, France
[21] Appl. No. 702,428
[22] Filed Feb. 1, 1968
[45] Patented Nov. 10, 1970
[73] Assignee Regie Nationale Des Usines Renault, Billancourt (Hauts de Seine) and Automobiles Peugeot, Paris, France
[32] Priority Feb. 15, 1967
[33] France
[31] 95,089

[54] TRIM CORRECTOR CONTROL DEVICES OF VEHICLES
11 Claims, 4 Drawing Figs.
[52] U.S. Cl. .................................................. 280/104, 180/41, 200/61.52, 280/6, 280/124
[51] Int. Cl. ........................................................ B60g 21/06
[50] Field of Search ........................................... 280/6, 6.11, 124(F), 104; 180/41

[56] References Cited
UNITED STATES PATENTS
2,911,230 11/1959 Peras ........................ 280/104
3,157,413 11/1964 Alfieri ....................... 280/124(F)
3,194,579 7/1965 Peras ........................ 280/104

Primary Examiner—A. Harry Levy
Attorney—Stevens, Davis, Miller & Mosher

ABSTRACT: A device for front and rear wheel suspensions of an automotive vehicle having trim correctors of the hydraulic and/or pneumatic type, comprising a reservoir containing a hydraulic mass of relatively great inertia and a partition dividing the reservoir into two compartments and adapted to pivot about an axis in case of acceleration or deceleration of the vehicle and in response to the movement of said hydraulic mass. Signal transmitters mounted on the reservoir are actuated by the movement of the partition and control the trim correctors by means of valves.

Patented Nov. 10, 1970

INVENTOR
JACQUES RENAUD

By Stevens, Davis, Miller & Mosher
ATTORNEYS

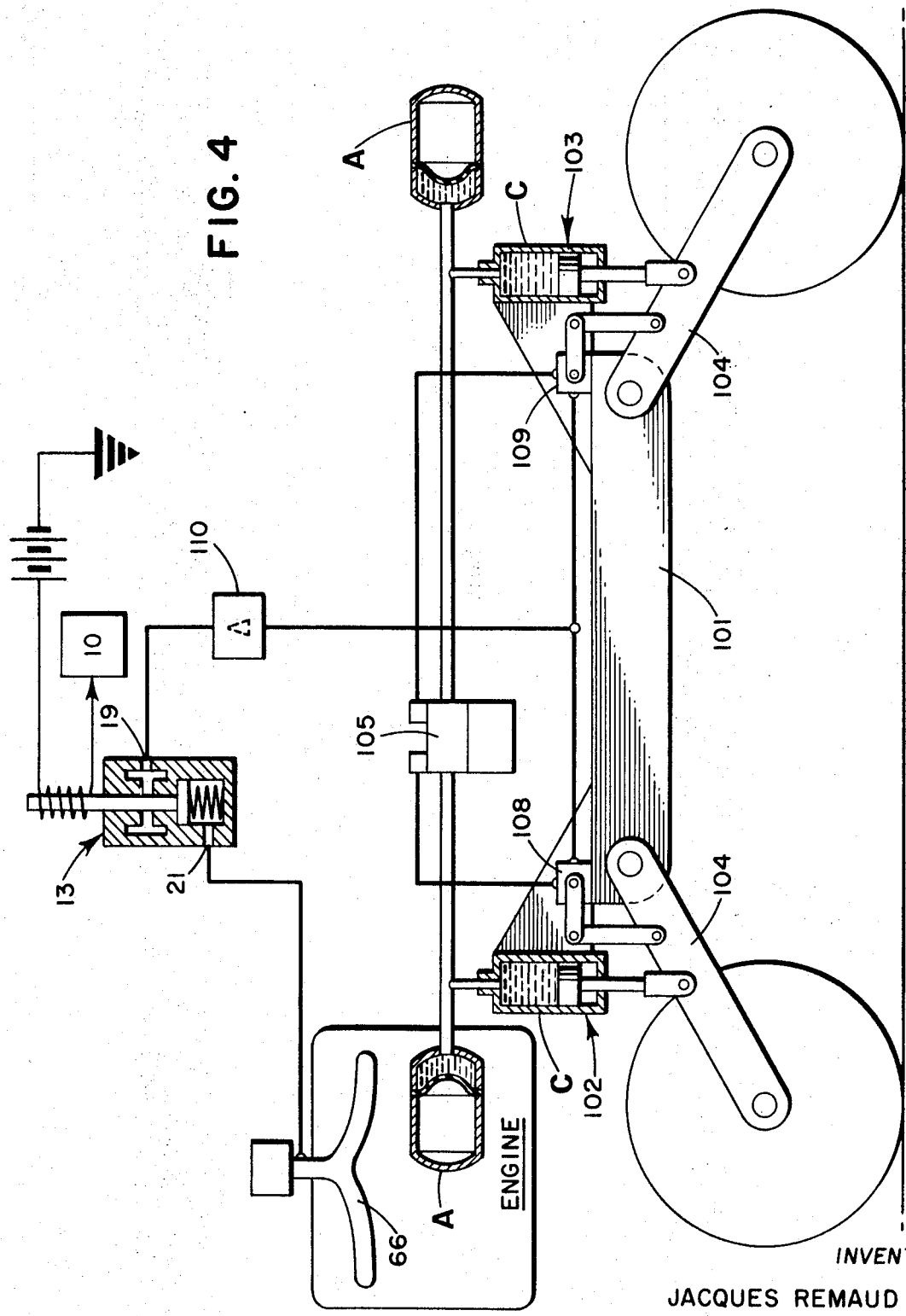

TRIM CORRECTOR CONTROL DEVICES OF VEHICLES

This invention relates to means for suppressing any overcorrection of the trim of an automotive vehicle during accelerations and decelerations or brake applications.

It is known that in vehicles equipped with particularly flexible suspension systems with trim correctors, such as described and illustrated in the U.S. Patent No. 3,194,579 issued to Lucien Peras on July 13, 1965 driving accelerations or decelerations are attended by the addition of extra load to the rear wheels or the front wheels of the vehicle, thus altering the trim thereof. This modification in the vehicle trim is all the more pronounced in the case of a high-flexibility suspension system.

In fact, if one considers as an example a deceleration period in excess of 3 to 4 seconds, i.e. the time lag introduced in the correction, and an acceleration following immediately this deceleration, as frequently observed in the case of a vehicle approaching red traffic lights changing to green before the vehicle has stopped completely as a consequence of the necessary brake application, so that a sudden acceleration takes place, the following phases take place:

a. first, a deceleration period caused by the brake application, involving an increased load on the front of the vehicle which is thus lowered while the rear is raised;
b. after a few seconds, the trim corrector becomes operative, thus reinflating the front suspension by increasing its pressure, and unloading the rear suspension by reducing its pressure, so that the vehicle recovers its normal position; and
c. upon release of the brake pedal, as the vehicle is no more subjected to the additional load caused by the brake application, it rears up; this movement is further accentuated if the vehicle is accelerated, thus causing additional load to be applied on the rear thereof.

This last phase is also observed in the reverse case, i.e. when an acceleration is followed by a brake application.

Driving a vehicle, especially in town traffic conditions, is thus a cause of particular discomfort due on the one hand to the very frequent changes in the vehicle trim and on the other hand to the fact that the suspension system is sometimes fully deflected to its stops and becomes abnormally stiff.

Another inconvenience arising with a known type of trim corrector lies in the fact that the fluid distributor and more particularly the pump become operative each time the vehicle is decelerated by releasing the accelerator pedal, or accelerated by depressing this pedal, which, not mention the noise resulting therefrom, is detrimental to the useful life of the parts involved.

It is the essential object of the present invention to provide an inertia-controlled device capable of avoiding these various inconveniences as well as overcorrections of the vehicle trim during alternate acceleration and deceleration phases, the pump, the distributor and the members associated therewith being allowed to restore the proper trim only in case of actual change in the load and also for compensating any deflection of the vehicle which might be caused by leaks in the general cylinder-distributor corrector circuit.

The device according to this invention for avoiding overcorrections in a vehicle of which the wheel suspension system comprises hydraulic and/or pneumatic correcting elements, is characterized by the provision of a reservoir containing a high-inertia hydraulic mass in two compartments separated by a central partition adapted to be deflected by said hydraulic mass in case of acceleration or deceleration of the vehicle for actuating means capable of transmitting signals controlling the members acting upon said trim correcting elements.

Other features and advantages of this invention will appear more clearly as the following description proceeds with reference to the attached drawing illustrating diagrammatically by way of example two typical forms of embodiment of the invention, it being understood that various modifications and variations may be brought thereto without departing from the spirit and scope of the invention as set forth in the appended claims.

In the drawing:

FIG. 4 illustrates in diagrammatic form the connection between the device of FIG. 1 and a known trim-correcting device.

Figure 1:
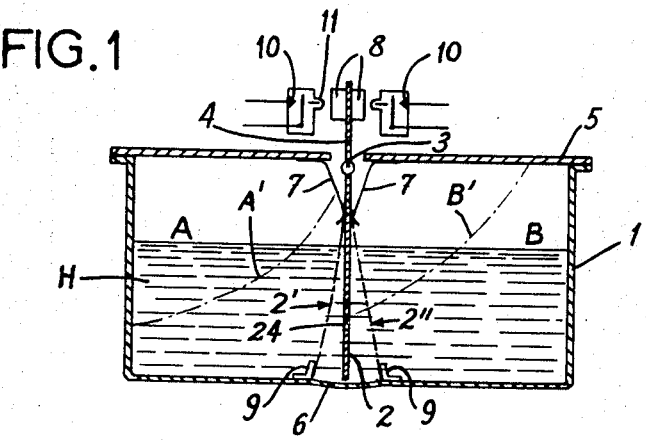
FIG. 1 illustrates a first form of embodiment of the device of this invention.

The device shown in FIG. 1 comprises a reservoir 1 of substantially rectangular configuration, filled with a suitable fluid such as oil H divided by a central partition 2 into two volumes, i.e. a rear fluid volume A and a front fluid volume B, these volumes being identical under normal driving conditions. The central partition 2 is adapted to oscillate about a pivot pin 3 secured to the walls of the reservoir and comprises an extension 4 beyond the upper edge of the reservoir 1, which is closed by a cover 5. The central portion of the bottom of reservoir 1 is of substantially cylindrical configuration, with a radius corresponding to the height of said partition 2 between its pivot axis 3 and the bottom 6. Spring means 7 secured to the underface of cover 5 clamp the upper portion of partition 2 to urge same in its median position shown in thick lines. Inertia weights 8 are secured to the projecting upper extension 4 of partition 2, their purpose consisting in so balancing the partition that it cannot be influenced by the accelerations of the vehicle or by the gradient on which the vehicle may be stopped. Stops 9 are fixed to the bottom 6 of the reservoir to limit the angular movement of the partition 2.

Registering with each inertia weight 8 is a front contact 10 the push knob 11 of which is responsive to the fluid mass during a movement of the movable partition 2 in one or the other direction, this movement resulting from the pressure applied to the fluid during the acceleration and deceleration periods. The closing of the corresponding contact causes a signal to be transmitted to show that the vehicle is accelerating or decelerating.

Figure 2:
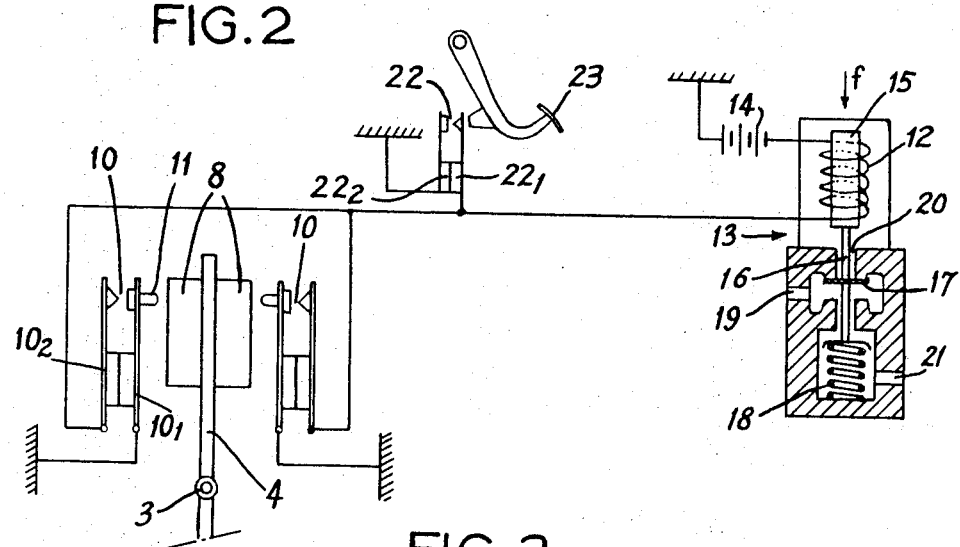
FIG. 2 illustrates in diagrammatic form the application of this device in the case of a trim corrector of the type described in the aforementioned patent.

As illustrated in FIG. 2, both contacts 10 are connected in parallel; their movable contact arms $10_1$ for example are grounded and the fixed contacts $10_2$ are connected to one end of the winding 12 of a three-way solenoid valve 13. The other end of winding 12 is connected to one terminal of a battery 14 having its other terminal grounded.

The core 15 of winding 12 of said solenoid valve is rigid with the rod 16 of a valve 17 urged by a spring to the position illustrated in FIG. 2 in the deenergized condition of said winding. In this case the valve 17 closes the communication between the port connected to the corrector circuit and the port 20 communicating with the atmosphere; however, the valve 17 permits a free communication between ports 19 and 21, the latter being connected to the vacuum circuit permitting the operation of the corrector. The energization of winding 12 causes the core 15 to be attracted in the direction of the arrow $f$ to isolate port 21.

A third front contact 22 actuated by the brake pedal 23 is mounted in parallel with contacts 10, its movable contact arm $22_1$ is connected to the solenoid winding 12 and its fixed contact $22_2$ is grounded.

The above-described arrangement operates as follows:

During the acceleration periods, the oil subjected to the resulting pressure is moved, its level changing from A to $A^1$ or B to $B^1$; due to the oil pressure the movable partition 2 pivots about its axis 3 and compresses one of the springs 7 to engage one of the stops 9 and close one of the contacts 10.

Under these conditions the solenoid valve 13 is energized and valve 17 closes the communication between port 19 and port 21 connected to the vacuum circuit, whereby on the one hand the port 19 now connected to port 20, and on the other hand the trim corrector circuits communicate with the external atmosphere. Under these conditions no trim correction can take place and when the acceleration ceases the normal trim of the vehicle is restored.

If the vehicle is on a pronounced gradient, the oil, by gravity, will exert a pressure on partition 2 and thus eliminate any correction possibility, but due to the provision of a gaged orifice 24 in partition 2 after a certain time period the oil will be at the same level on either side of the partition, the latter being then in its intermediate position; thus, the trim correction can take place again. Therefore, this correction is not disturbed by the fact that the vehicle is on a gradient, and the suspension cylinders can be reactuated normally.

If the vehicle is stopped after a long brake application, for example on a slope, which implies that the driver keeps the brake pedal depressed, the device will operate as follows, in the absence of any signal contact on the brake pedal:

a. during the brake application period, the device would prevent any correction, but the vehicle would not have its normal trim, since the additional load on the front wheel would cause it to bow;

b. once the vehicle has been brought to a standstill, if the foot pressure is maintained on the brake pedal, the positive action of the brakeshoes would prevent the vehicle from resuming its normal trim. As the oil H contained in the reservoir 1 is no more subjected to an acceleration and leaves the central partition 2 undisturbed, the trim corrector would be allowed to operate. It would even operate beyond the necessary limit since the resumption of the vehicle trim would be retarded by the action of the rear brakes. Then, upon release of the brakes, the vehicle would rear abnormally.

This inconvenience is avoided by the provision of the brake pedal contact 22 which eliminates any possibility of trim correction when the brakes are applied.

Since the operation of the device according to this invention is based on the force of inertia of the oil mass, it is clear that this device will also be operative during deceleration periods due to engine braking.

Figure 3:
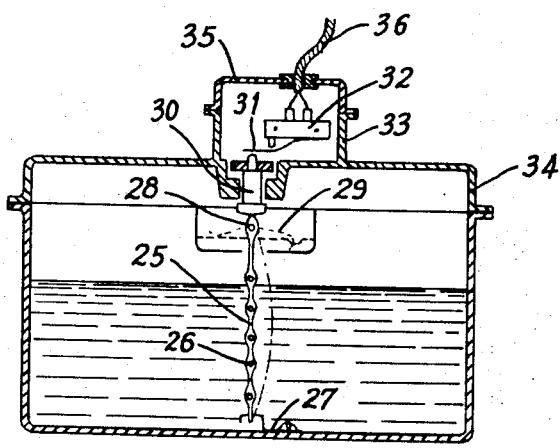
FIG. 3 is a modified form of embodiment of the device illustrated in FIG. 1.

In the modified form of embodiment illustrated in FIG. 3 the partition 25 is reinforced by transverse ribs 26. Its lower portion is attached by an anchor member 27 to the flat bottom of reservoir 1; the upper portion 28 of this partition is free and spring means 29 constantly urge same to the vertical in the normal position of the vehicle.

The upper edge 28 of partition 25 engages a piston 30 which, being allowed to move downwards when the partition is deflected by the action of the hydraulic masses as shown by the dash-and-dot line, releases the control member 31 of a switch 32 which maintains a pushbutton of said switch in a position where the switch is open. The releasing of the control member 31 permits the switch to close an electric circuit. This switch is housed in a case 33 rigid with the cover 34 of reservoir 1, this case 33 being closed in turn by a cover 35 through which conductors 36 connect the switch 32 to the control solenoid valve.

The device illustrated in FIG. 3 operates exactly like the one described hereinabove with reference to FIGS. 1 and 2.

In these examples the signal is transmitted electrically, but it would not constitute a departure from the spirit and scope of the invention to use pneumatic, hydraulic or mechanical means for transmitting the corresponding signal to a suitable control member or device.

The present invention can be used advantageously, e.g., in a vehicle attitude-correcting device such as the one shown in U.S. Pat. No. 3,374,848, issued Mar. 26, 1968, to Gaetan de Castelet. This device, as shown diagrammatically in FIG. 4, comprises a hydraulic distributor 105 connected on one hand to a source of pressurized fluid (not shown) and on the other hand to a valve 108 of a front wheel suspension 102. Valves 108 and 109, together with a manually controlled selector valve 110 constitute a trim corrector device permitting different ground clearances for the suspension. Each of the valves 108 and 109 is associated to a wheel arm 104 pivotally fixed to the vehicle chassis 101. Each suspension 102 or 103 comprises a hydraulic cylinder C associated to a hydropneumatic element A, intermediate to wheel arm 104 and the chassis 101.

The three-way valve 13 of the present invention device is inserted between the manually controlled valve 110 and the vehicle engine inlet tract 66, constituting a depression source, in such a manner that the port 19 is connected to the valve 110 and the port 21 to the inlet tract 66. The valve 13 thus controls the pressure fluid flow in the trim corrector device.

I claim:

1. A device for avoiding overcorrection of the trim of a vehicle by fluid actuated trim correctors for the front and rear wheel suspensions during periods of acceleration and braking of the vehicle comprising a source of fluid pressure for said trim correctors, a reservoir containing a hydraulic mass of relatively great inertia, partition means dividing said reservoir into two compartments, means mounting said partition for movement selectively by said hydraulic mass in response to acceleration and braking of the vehicle, means connected to said source and trim correctors controlling the flow of fluid from said source to said trim correctors, control signal-transmitting means connected to said control means, and actuating means responsive to the motion of said partition means to actuate said signal-transmitting means for transmitting appropriate control signals to said trim corrector control means.

2. A device according to claim 1 further comprising at least on gauged orifice formed in said movable partition to permit fluid communication between said two compartments.

3. A device according to claim 1 wherein said movable partition is pivotally mounted in said reservoir and includes at least a portion extending out of the reservoir beyond the pivotal axis.

4. A device according to claim 3 wherein said actuating means comprises inertia weight means on said extended portion, said weight means being adapted to actuate said signal-transmitting means.

5. A device according to claim 1 further comprising antagonistic spring means disposed on either side of said movable partition biasing it towards a normal position.

6. A device according to claim 1 further comprising stop means provided in the bottom of said reservoir for limiting the movement of said partition.

7. A device according to claim 1 wherein said fluid flow control means comprises solenoid valve means operatively connected to selectively control the operation of said trim correctors.

8. A device according to claim 1 wherein said control signal transmitting means comprises switch means having movable contact means selectively engageable by said actuating means and at least two fixed contacts connected in parallel and selectively engaged by said movable contact means.

9. A device according to claim 8 further comprising second switch means connected in parallel with said switch means and actuated by the brake pedal of said vehicle.

10. A device according to claim 1 wherein said movable partition includes transverse ribs and has its bottom end secured to the bottom of said reservoir, the deflection of said partition by said hydraulic mass causing actuation of said signal-transmitting means.

11. A device according to claim 10 wherein said signal-transmitting means comprises a switch mounted at the upper portion of the movable partition, piston means mounted above the free end of said partition means and adapted to maintain said switch in an open condition when said movable partition is in normal position and adapted when lowered as a result of distortion of said movable partition to close said switch.